United States Patent
Manabe et al.

(10) Patent No.: US 8,913,874 B2
(45) Date of Patent: Dec. 16, 2014

(54) INFORMATION PROCESSING APPARATUS, SAMENESS DETERMINATION SYSTEM, SAMENESS DETERMINATION METHOD, AND COMPUTER PROGRAM

(75) Inventors: Yoshihiro Manabe, Tokyo (JP); Yuichi Abe, Tokyo (JP); Hideki Noma, Kanagawa (JP); Tsugutomo Enami, Saitama (JP); Akifumi Kashiwagi, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 13/155,596

(22) Filed: Jun. 8, 2011

(65) Prior Publication Data

US 2011/0305432 A1   Dec. 15, 2011

(30) Foreign Application Priority Data

Jun. 15, 2010   (JP) ................................ P2010-136304

(51) Int. Cl.
*H04N 5/92* (2006.01)
*H04N 21/488* (2011.01)
*H04N 21/44* (2011.01)
*H04N 21/81* (2011.01)

(52) U.S. Cl.
CPC ....... *H04N 21/8133* (2013.01); *H04N 21/4884* (2013.01); *H04N 21/44008* (2013.01)
USPC .......................................... 386/248; 386/239

(58) Field of Classification Search
None
See application file for complete search history.

(56) References Cited

U.S. PATENT DOCUMENTS

| 2006/0045346 | A1* | 3/2006 | Zhou ............................ 382/190 |
| 2007/0011012 | A1* | 1/2007 | Yurick et al. ................. 704/277 |
| 2007/0192310 | A1* | 8/2007 | Takagi et al. ..................... 707/5 |
| 2007/0250319 | A1* | 10/2007 | Tateishi et al. ................ 704/251 |
| 2008/0126092 | A1* | 5/2008 | Kawazoe et al. ............. 704/246 |
| 2010/0122309 | A1* | 5/2010 | Kawakami et al. ........... 725/116 |

FOREIGN PATENT DOCUMENTS

JP   2009-177822   8/2009

\* cited by examiner

*Primary Examiner* — William C Vaughn, Jr.
*Assistant Examiner* — Eileen Adams
(74) *Attorney, Agent, or Firm* — Sony Corporation

(57) ABSTRACT

There is provided an information processing apparatus which includes a subtitle processing unit for extracting a subtitle feature quantity representing a feature of a content from subtitle information included in the content, a subtitle feature quantity accumulation unit for associating and storing identification information capable of identifying the content and the subtitle feature quantity extracted from the content by the subtitle processing unit, a subtitle feature quantity collation unit for collating the subtitle feature quantity stored in the subtitle feature quantity accumulation unit and a subtitle feature quantity to be determined, thereby determining sameness between the content corresponding to the subtitle feature quantity stored in the subtitle feature quantity accumulation unit and a content corresponding to the subtitle feature quantity to be determined, and a collation result output unit for outputting a collation result of the subtitle feature quantity collation unit.

13 Claims, 5 Drawing Sheets

INFORMATION PROCESSING APPARATUS, SAMENESS DETERMINATION SYSTEM, SAMENESS DETERMINATION METHOD, AND COMPUTER PROGRAM

BACKGROUND

The present disclosure relates to an information processing apparatus, a sameness determination system, a sameness determination method, and a computer program, and more particularly, to an information processing apparatus, a sameness determination system, a sameness determination method, and a computer program for determining sameness of a motion picture content having subtitle information.

In recent years, services are provided to share users' comments on motion picture contents on the Internet. When sharing a comment, it is necessary to identify which motion picture content a user is making a comment on, since there are many motion picture contents.

SUMMARY

However, there may be a case where it is difficult to identify a commented motion picture content. For example, in a case where a motion picture content exists on the Internet from the beginning, the commented motion picture content can be easily identified by using a URI (Uniform Resource Identifier) and the like that are used when the user views the motion picture content. However, in a case where the motion picture content is, for example, a television program recorded by the user with a recorder at home, it is difficult to find on the Internet that the comment is made on the television program. If the user making the comment lives in the same area, it may be possible to identify the television program from a combination of information about a broadcast time and a television station. However, if the user making the comment lives in a different area, the program may be provided by a different television station or broadcast at a different time even though it is the same program.

Meanwhile, in the related art, a motion picture content is identified by extracting an image feature quantities from image information about the motion picture contents and obtaining the degree of match between the image feature quantities (for example, Japanese Patent Application Laid-Open No. 2009-177822). In such process of identification, however, the processing for extracting the image feature quantity is complicated. Therefore, there is an issue in that it takes an extremely long time to calculate the image feature quantity.

In light of the foregoing, it is desirable to provide a novel and improved information processing apparatus, sameness determination system, sameness determination method, and computer program, capable of determining sameness of a motion picture content at a high speed.

According to an embodiment of the present disclosure, there is provided an information processing apparatus which includes a subtitle processing unit for extracting a subtitle feature quantity representing a feature of a content from subtitle information included in the content, a subtitle feature quantity accumulation unit for associating and storing identification information capable of identifying the content and the subtitle feature quantity extracted from the content by the subtitle processing unit, a subtitle feature quantity collation unit for collating the subtitle feature quantity stored in the subtitle feature quantity accumulation unit and a subtitle feature quantity to be determined, thereby determining sameness between the content corresponding to the subtitle feature quantity stored in the subtitle feature quantity accumulation unit and a content corresponding to the subtitle feature quantity to be determined, and a collation result output unit for outputting a collation result of the subtitle feature quantity collation unit.

The subtitle processing unit may include a subtitle information separation unit for separating subtitle information included in a content from the content, and a subtitle feature quantity extraction unit for extracting at least an array including a time interval between subtitles as the subtitle feature quantity on the basis of the subtitle information separated by the subtitle information separation unit.

Moreover, the subtitle feature quantity extraction unit may arrange the subtitle data representing a plurality of subtitle contents included in the content in a time sequence on the basis of display times of the subtitle data, and may calculate, as an array of time interval between the subtitles, a numerical string including a difference of the display times of the subtitle data adjacent to each other in the time sequence.

Furthermore, the subtitle feature quantity extraction unit may extract, as a subtitle feature quantity, the subtitle data representing the subtitle content from the subtitle information.

In a case where the subtitle feature quantity extracted by the subtitle processing unit matches, at least partially, the subtitle feature quantity to be determined, the subtitle feature quantity collation unit may determine that the contents from which these subtitle feature quantities are extracted are the same.

Moreover, in a case where the subtitle feature quantity extracted by the subtitle processing unit partially matches the subtitle feature quantity to be determined, the subtitle feature quantity collation unit may calculate a degree of match between these subtitle feature quantities.

In a case where the subtitle feature quantity collation unit determines that there are a plurality of contents between which a degree of match is equal to or more than a predetermined rate, the collation result output unit may output identification information of these contents as a collation result.

The subtitle feature quantity accumulation unit may store the subtitle feature quantity using an N-gram method.

In a case where the content is a terrestrial digital broadcasting content that is broadcasted in terrestrial digital broadcasting, the subtitle processing unit may extract the subtitle feature quantity on the basis of subtitle information of a one-segment broadcasting content that is broadcasted in one-segment broadcasting simultaneously with the terrestrial digital broadcasting content when the terrestrial digital broadcasting content does not include any subtitle information.

According to another embodiment of the present disclosure, there is provided an information processing apparatus which includes a subtitle information separation unit for separating subtitle information included in a content from the content, a subtitle feature quantity extraction unit for extracting a subtitle feature quantity representing a feature of the content on the basis of the subtitle information separated by the subtitle information separation unit, and a comment information output unit for transmitting comment information to an information providing server providing a user's comment on a network, wherein the comment information is made by attaching the subtitle feature quantity extracted by the subtitle feature quantity extraction unit to the user's comment made on the content.

According to another embodiment of the present disclosure, there is provided a sameness determination system for determining a sameness of a content, the sameness determination system which includes an information processing apparatus for inputting a user's comment on the content, and an information providing server for providing, on a network, the user's comment transmitted from the information processing apparatus, wherein the information processing apparatus includes, a subtitle information separation unit for separating subtitle information included in a content from the content, a subtitle feature quantity extraction unit for extracting a subtitle feature quantity representing a feature of the content on the basis of the subtitle information separated by the subtitle information separation unit, a comment input unit for inputting the user's comment made on the content, and a comment information output unit for transmitting comment information to an information providing server providing a user's comment on a network, the comment information being made by attaching the subtitle feature quantity extracted by the subtitle feature quantity extraction unit to the user's comment made on the content, and the information providing server includes, a subtitle processing unit for extracting a subtitle feature quantity representing a feature of a content from subtitle information included in the content, a subtitle feature quantity accumulation unit for associating and storing identification information capable of identifying the content and a subtitle feature quantity extracted from the content by the subtitle processing unit, a subtitle feature quantity collation unit for collating the subtitle feature quantity stored in the subtitle feature quantity accumulation unit and the subtitle feature quantity included in the comment information transmitted from the information processing apparatus, thereby determining sameness between the content corresponding to the subtitle feature quantity stored in the subtitle feature quantity accumulation unit and a content corresponding to the subtitle feature quantity in the comment information, and a collation result output unit for outputting a collation result of the subtitle feature quantity collation unit.

Moreover, according to another embodiment of the present disclosure, there is provided a sameness determination method which includes causing a subtitle information separation unit of an information processing apparatus for inputting a user's comment made on a content to separate subtitle information included in a content from the content, causing a subtitle feature quantity extraction unit of the information processing apparatus to extract a subtitle feature quantity representing a feature of the content on the basis of the subtitle information separated by the subtitle information separation unit, causing a comment information output unit of the information processing apparatus to transmit comment information to an information providing server providing a user's comment on a network, wherein the comment information is made by attaching the subtitle feature quantity extracted by the subtitle feature quantity extraction unit to the user's comment made on the content input to the information processing apparatus, causing a subtitle processing unit of the information providing server to extract a subtitle feature quantity representing a feature of a content from subtitle information included in the content, collating the subtitle feature quantity stored in the subtitle feature quantity accumulation unit associating and storing identification information capable of identifying the content and a subtitle feature quantity extracted from the content by the subtitle processing unit and a subtitle feature quantity included in the comment information transmitted from the information processing apparatus, thereby determining sameness between the content corresponding to the subtitle feature quantity stored in the subtitle feature quantity accumulation unit and a content corresponding to the subtitle feature quantity of the comment information, and causing the collation result output unit to output a collation result of the subtitle feature quantity collation unit.

Furthermore, according to another embodiment of the present disclosure, there is provided a computer program for achieving a function of an information processing apparatus which includes a subtitle processing unit for extracting a subtitle feature quantity representing a feature of a content from subtitle information included in the content, and a subtitle feature quantity collation unit for collating the subtitle feature quantity stored in a subtitle feature quantity accumulation unit, which associates and stores identification information capable of identifying the content and a subtitle feature quantity extracted from the content by the subtitle processing unit, and a subtitle feature quantity to be determined, thereby determining sameness between the content corresponding to the subtitle feature quantity stored in the subtitle feature quantity accumulation unit and a content corresponding to the subtitle feature quantity to be determined.

A program is stored in a storage device provided in a computer, and is read and executed by a CPU provided in the computer, so that the computer is caused to function as the above information processing apparatus. Further, a computer-readable recording medium is provided. Examples of recording media include a magnetic disk, an optical disk, and an MO (Magneto-Optical) disk. Examples of magnetic disks include a hard disk and a disk-shaped magnetic disk. Examples of optical disks include a CD (Compact Disc), a DVD-R (Digital Versatile Disc Recordable), and a BD (Blu-Ray Disc®).

As described above, the present disclosure can provide a novel and improved information processing apparatus, sameness determination system, sameness determination method, and computer program, capable of determining sameness of a motion picture content at a high speed.

DETAILED DESCRIPTION OF THE EMBODIMENT

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. Overview of sameness determination system
2. Configuration of sameness determination system 3. Sameness determination processing performed on content by sameness determination system 4. Example of hardware configuration <1. Overview of Sameness Determination System>

Figure 1:
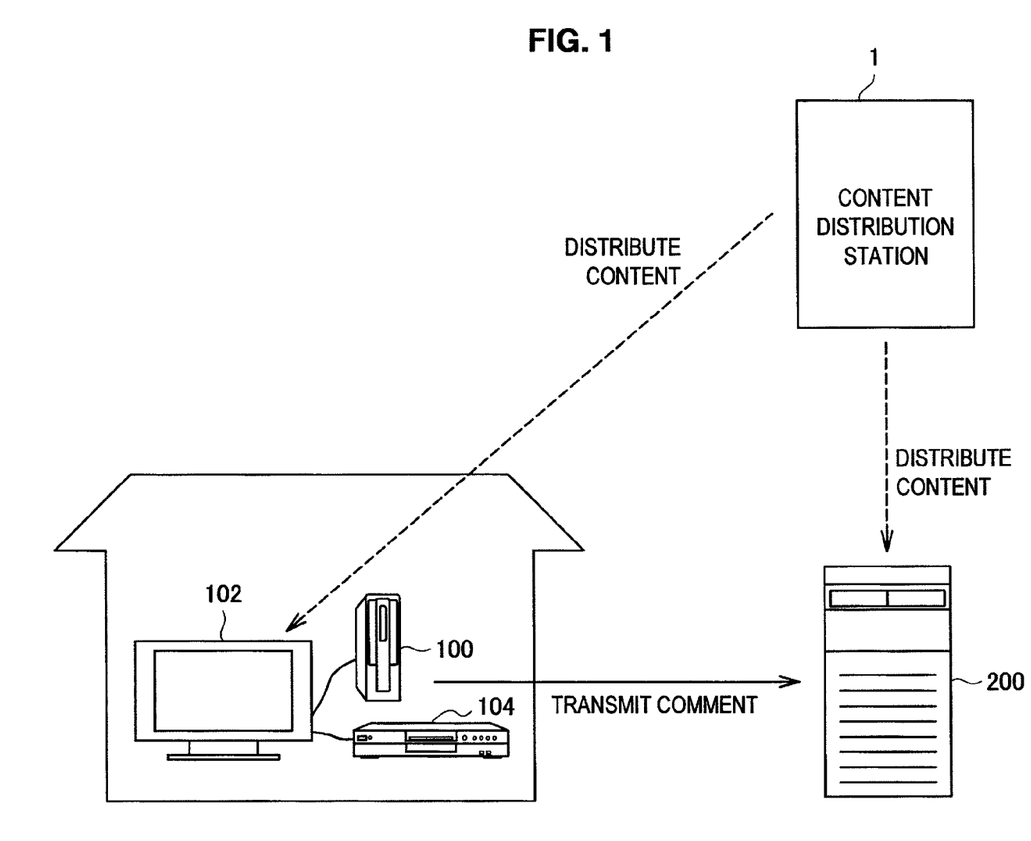
FIG. 1 is an explanatory diagram illustrating an overview of a sameness determination system according to an embodiment of the present disclosure.

First, an overview of a sameness determination system according to the embodiment of the present disclosure will be explained with reference to FIG. 1. FIG. 1 is an explanatory diagram illustrating an overview of a sameness determination system according to the embodiment.

For example, as shown in FIG. 1, the sameness determination system according to the embodiment includes an information processing apparatus 100 used by a user viewing a motion picture content and an information providing server 200 capable of identifying a motion picture content corresponding to a comment transmitted from the user. For example, a content distribution station 1 is a television station distributing a television program as a motion picture content. The content distribution station 1 distributes a motion picture content to a television set 102 used by a user viewing the motion picture content and the information providing server 200 providing users' comments on the motion picture content on the Internet. At this occasion, the user can record a distributed television program to a recorder 104.

The user viewing the motion picture content provided from a content distribution station 1 can transmit a comment such as a review of the motion picture content that the user has viewed to the information providing server 200 via a network so as to publish the comment on the Internet. The comment can be input to a screen of the television set 102 using an input device such as a remote controller of the television set 102. A subtitle feature quantity, that is, information for identifying the commented motion picture content is added to the comment, which is transmitted to the information providing server 200 as comment information.

In the sameness determination system according to the embodiment, the information processing apparatus 100 for extracting the subtitle feature quantity, that is, the information for identifying the commented motion picture content, is connected to the television set 102. In FIG. 1, the information processing apparatus 100 and the television set 102 are separately provided. However, the present disclosure is not limited to such example. Alternatively, the information processing apparatus 100 may be incorporated in the television set 102 or the recorder 104. When the information processing apparatus 100 transmits a comment to the information providing server 200, the information processing apparatus 100 obtains the subtitle feature quantity by analyzing the commented motion picture content, and attaches the subtitle feature quantity to the comment.

On the other hand, the information providing server 200 extracts the subtitle feature quantity of the motion picture content received from the content distribution station 1, like the information processing apparatus 100. Then, when the information providing server 200 receives a comment from the user, the information providing server 200 identifies the commented motion picture content by comparing the subtitle feature quantity attached to the comment and the subtitle feature quantity extracted by the information providing server 200.

As described above, the sameness determination system according to the embodiment uses the subtitle feature quantity extracted on the basis of the subtitle information of the motion picture content to perform the sameness determination processing of the content. Therefore, it is assumed that the subtitle information is basically attached to the motion picture content. However, in a case where the subtitle information of the motion picture content can be obtained from other information related to the motion picture content, the subtitle information does not necessarily need to be attached to the motion picture content itself. For example, in a case of digital terrestrial broadcasting, subtitle information of a television program for the digital terrestrial broadcasting may be obtained from subtitle information of a television program simultaneously distributed in one-segment broadcasting.

The feature quantity can be extracted with a less load, and the amount of information can be reduced when the subtitle feature quantity extracted from the subtitle information is used in the sameness determination processing of the content, as compared with a case in the related art in which the image feature quantity extracted from image information about the motion picture content is used. Therefore, the sameness determination processing of the motion picture content can be performed at a high speed. The sameness determination processing performed on a content by the above sameness determination system will be hereinafter explained in detail.

<2. Configuration of Sameness Determination System>

Figure 2:
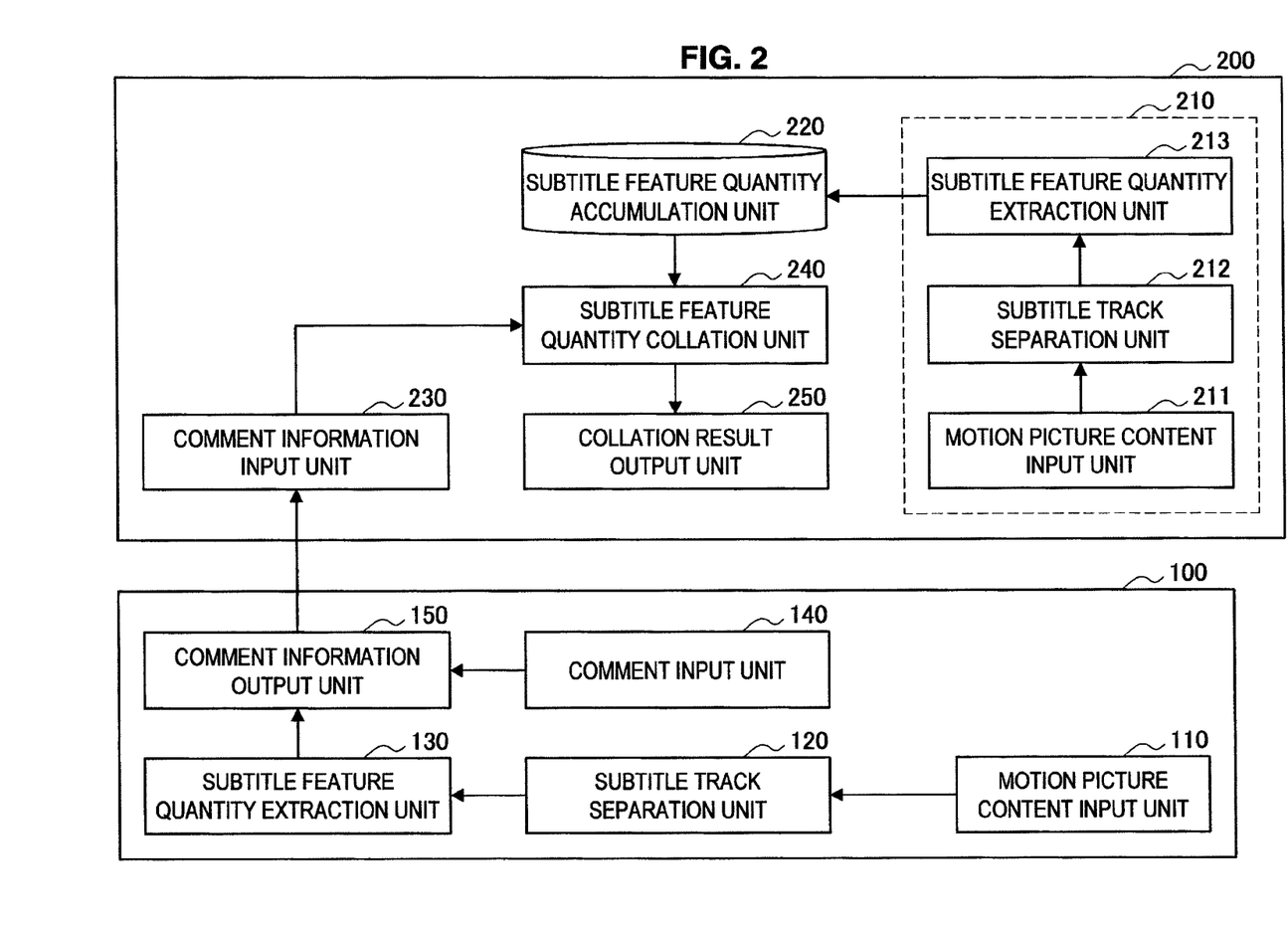
FIG. 2 is a block diagram illustrating a functional configuration of the sameness determination system according to the embodiment.

First, the functional configuration of the sameness determination system according to the embodiment will be explained with reference to FIG. 2. FIG. 2 is a block diagram illustrating the functional configuration of the sameness determination system according to the embodiment. As described above, the sameness determination system according to the embodiment includes the information processing apparatus 100 provided at the user and an information providing server 200 providing a comment transmitted from the user, which are connected via the network.

The information processing apparatus 100 is an apparatus capable of extracting the subtitle feature quantity from the subtitle information included in the motion picture content, and is provided in a user-side apparatus for viewing the motion picture content (for example, the television set 102 and the recorder 104). As shown in FIG. 2, the information processing apparatus 100 includes a motion picture content input unit 110, a subtitle track separation unit 120, a subtitle feature quantity extraction unit 130, a comment input unit 140, and a comment information output unit 150.

The motion picture content input unit 110 is an interface for inputting the motion picture content from which the subtitle feature quantity is extracted. For example, the motion picture content input unit 110 receives the motion picture content distributed by the content distribution station 1 directly from the content distribution station 1 or via the television set 102, the recorder 104, and the like. The motion picture content input unit 110 outputs the received motion picture content to the subtitle track separation unit 120.

The subtitle track separation unit 120 performs processing for extracting a subtitle track from the motion picture content as subtitle information. The subtitle track separation unit 120 outputs the extracted subtitle track to the subtitle feature quantity extraction unit 130.

The subtitle feature quantity extraction unit 130 performs processing for extracting the subtitle feature quantity representing the feature of the motion picture content on the basis of the subtitle track. For example, the subtitle feature quantity is a time interval between subtitles, a content of subtitle, and the like. The extraction processing of the subtitle feature quantity will be explained later in detail. The subtitle feature quantity extraction unit 130 outputs the extracted subtitle feature quantity to the comment information output unit 150.

The comment input unit 140 is an interface for inputting a user's comment on the motion picture content. When the user inputs a comment using the input device, the comment is input to the comment input unit 140. The comment input unit 140 outputs the received comment to the comment information output unit 150.

The comment information output unit 150 transmits the user's comment on the motion picture content to the information providing server 200. At this occasion, the comment information output unit 150 attaches the subtitle feature quantity extracted by the subtitle feature quantity extraction unit 130 to the user's comment, which is transmitted as comment information to the information providing server 200.

On the other hand, the information providing server 200 is a server providing a sharing service of users' comments on motion picture contents on the Internet, and has a function of determining sameness of a motion picture content using a subtitle feature quantity. As shown in FIG. 2, the information providing server 200 includes a subtitle processing unit 210, a subtitle feature quantity accumulation unit 220, a comment information input unit 230, a subtitle feature quantity collation unit 240, and a collation result output unit 250. Among the functions of the information providing server 200 only a functional unit used for the sameness determination processing performed on a motion picture content is shown in FIG. 2.

The subtitle processing unit 210 is a processing unit for performing processing for extracting the subtitle feature quantity from subtitle information of a motion picture content, and includes a motion picture content input unit 211, a subtitle track separation unit 212, and a subtitle feature quantity extraction unit 213. The motion picture content input unit 211, the subtitle track separation unit 212, and the subtitle feature quantity extraction unit 213 respectively perform the same processings as those performed by the motion picture content input unit 110, the subtitle track separation unit 120, and the subtitle feature quantity extraction unit 130 of the information processing apparatus 100.

That is, the motion picture content input unit 211 is an interface for receiving the motion picture content from the content distribution station 1, and outputs the received motion picture content to the subtitle track separation unit 212. The subtitle track separation unit 212 extracts the subtitle track, that is, subtitle information, from the motion picture content, and outputs the subtitle track to the subtitle feature quantity extraction unit 213. The subtitle feature quantity extraction unit 213 extracts the subtitle feature quantity from the extracted subtitle track. In this case, the subtitle feature quantity extracted by the subtitle feature quantity extraction unit 213 is represented by the same index as the subtitle feature quantity extracted by the subtitle feature quantity extraction unit 130 of the information processing apparatus 100. The subtitle feature quantity extraction unit 213 associates the extracted subtitle feature quantity with each motion picture content, and records the extracted subtitle feature quantity to the subtitle feature quantity accumulation unit 220.

The subtitle feature quantity accumulation unit 220 stores the subtitle feature quantity extracted by the subtitle feature quantity extraction unit 213 in association with each motion picture content. For example, subtitle feature quantity accumulation unit 220 stores the subtitle feature quantity as well as a content ID unique to the motion picture content (identification information for identifying the motion picture content). At this occasion, a plurality of subtitle feature quantities representing the features of the motion picture content with different indexes such as an array of time intervals between subtitles and a subtitle content may be associated with a motion picture content, and stored therein. How the subtitle feature quantity is stored may be changed as necessary in order to perform the sameness determination processing on the motion picture content at a high speed. For example, in a case where the subtitle feature quantity is a numerical string, N-gram method may be used to mechanically cut out characters in units of N characters from a character string subjected to full-text searching, and the cut out characters may be stored.

The comment information input unit 230 is an interface for receiving the comment information from the information processing apparatus 100. The comment information input unit 230 outputs the received comment information to the subtitle feature quantity collation unit 240.

The subtitle feature quantity collation unit 240 performs the sameness determination processing on the motion picture content on the basis of the subtitle feature quantity included in the comment information transmitted from the information processing apparatus 100 and the subtitle feature quantity stored in the subtitle feature quantity accumulation unit 220. The subtitle feature quantity collation unit 240 searches the subtitle feature quantity stored in the subtitle feature quantity accumulation unit 220 for a subtitle feature quantity matching the subtitle feature quantity included in the comment information, and identifies a motion picture content whose subtitle feature quantity matches the subtitle feature quantity included in the comment information. The subtitle feature quantity collation unit 240 outputs a collation result to the collation result output unit 250. The collation result indicates whether a motion picture content is identified by the collation of the subtitle feature quantity or not. In a case where the motion picture content is identified, the collation result includes identification information for identifying the motion picture content (such as a content ID).

The collation result output unit 250 is an interface for outputting the collation result received from the subtitle feature quantity collation unit 240 to another processing unit. For example, in a case where the commented motion picture content is identified by the collation of the subtitle feature quantity collation unit 240, the collation result output unit 250 can also output the collation result to a functional unit (not shown) performing processing for publishing the comment on the Internet. Alternatively, for example, in a case where the commented motion picture content may not be identified, the collation result output unit 250 can also output the collation result to a functional unit (not shown) requesting the information processing apparatus 100 at the user side to transmit a subtitle feature quantity represented with a different index.

The functional configuration of the sameness determination system according to the embodiment has been hereinabove explained.

<3. Sameness Determination Processing Performed on Content by Sameness Determination System>

Figure 3:
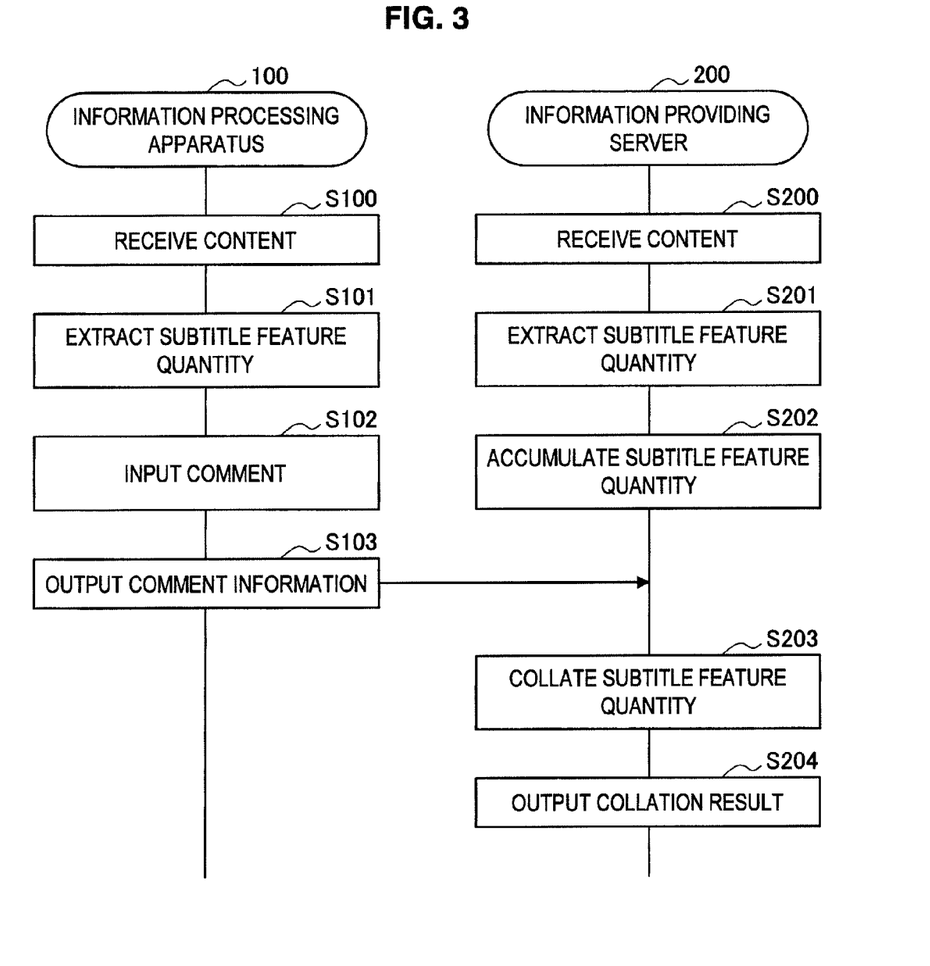
FIG. 3 is a flowchart illustrating a sameness determination processing performed on a content by the sameness determination processing system according to the embodiment.
Figure 4:
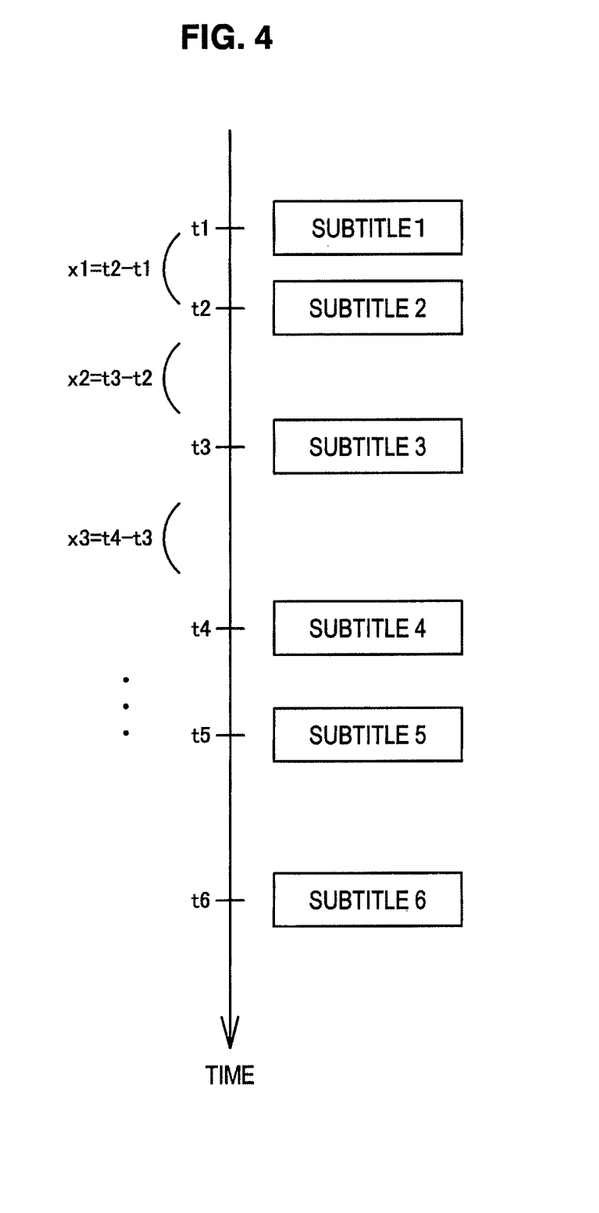
FIG. 4 is an explanatory diagram illustrating an example of extraction processing of a subtitle feature quantity.

Subsequently, the sameness determination processing performed on a content by the sameness determination system will be explained with reference to FIGS. 3 and 4. FIG. 3 is a flowchart illustrating the sameness determination processing performed on a content by the sameness determination system according to the embodiment. FIG. 4 is an explanatory diagram illustrating an example of extraction processing of a subtitle feature quantity.

In the sameness determination processing performed on a content by the sameness determination system, processing for extracting a subtitle feature quantity of a motion picture content distributed by the content distribution station 1 is performed first (S100, S101, S200, and S201). When the information processing apparatus 100 at the user side receives the motion picture content from the content distribution station 1 (S100), the subtitle track separation unit 120 and the subtitle feature quantity extraction unit 130 extract the subtitle feature quantity (S101). In the embodiment, the subtitle feature quantity is extracted using subtitle data having multiple time stamps, included in the subtitle track, each specifying a time when a display device is caused to display the content.

More specifically, as shown in FIG. 4, the subtitle data included in the subtitle track is arranged in the ascending order of the time stamp as follows: subtitle 1, subtitle 2, subtitle 3, . . . . The time stamps of the subtitle data are denoted with t1, t2, t3, . . . , respectively. In this case, a difference of each time stamp is defined as x (i) (=t (i+1)−t (i)). The difference x (i) is a value not relying on the start point of the time stamps but relying only on an interval between displays of subtitles. This difference x (i) is used as a subtitle feature quantity, with which the motion picture content can be accurately collated.

Then, when the information processing apparatus 100 receives a user's comment on the motion picture content from the comment input unit 140 (S102), the comment information output unit 150 transmits the comment information having the subtitle feature quantity attached to the comment to the information providing server 200 (S103).

On the other hand, when the content distribution station 1 distributes a content, the information providing server 200 performs the same processing as steps S100, S101 (S200, S201). The subtitle feature quantity extracted by the subtitle feature quantity extraction unit 213 of the information providing server 200 is accumulated in the subtitle feature quantity accumulation unit 220 (S202). The information providing server 200 extracts the subtitle feature quantity with a predetermined time interval or at a time when the content distribution station 1 distributes a motion picture content. The information providing server 200 waits for receiving comment information from the user while the information providing server 200 has the subtitle feature quantity of the motion picture content.

Thereafter, when the information providing server 200 receives the comment information from the information processing apparatus 100, the subtitle feature quantity collation unit 240 searches a motion picture content matching the subtitle feature quantity included in the comment information from the subtitle feature quantities accumulated in the subtitle feature quantity accumulation unit 220 (S203). As described above, since the subtitle feature quantity is a simple numerical string representing an interval between displays of subtitles that is calculated from the time stamps in the subtitle data, generally-available search algorithms used for text string searches may be applied at this occasion.

The subtitle feature quantity collation unit 240 may determine the sameness of the motion picture content not by full match but by partial match, so that the subtitle feature quantity collation unit 240 can process even a subtitle feature quantity received from the information processing apparatus 100 is generated from a portion of the motion picture content. In a case where partially matching motion picture contents are determined to be the same, the determination may be made as follows. For example, when a percentage representing the degree of partial match is equal to or more than a predetermined value, the contents may be determined to be the same. Alternatively, a motion picture content having the highest percentage representing the degree of partial match may be adopted as the matching content. It should be noted that a larger percentage representing the degree of partial match indicates a higher degree of similarity of a motion picture content.

Then, the collation result of the subtitle feature quantities provided by the subtitle feature quantity collation unit 240 is output from the collation result output unit 250 (S204). The simplest output from the collation result output unit 250 is the output of a content ID of a motion picture content determined to be the same. In a case where partially matching motion picture contents are determined to be the same, the determination may be made as follows. The collation result output unit 250 may output not only the content ID but also a percentage representing the degree of match between partially matching subtitle feature quantities as more detailed information. Accordingly, the likelihood of correctness of the identified motion picture content can be provided as information.

Alternatively, when a percentage representing the degree of match between subtitle feature quantities of a plurality of motion picture contents is determined to be a predetermined value, the contents ID of these motion picture contents may be output in order to perform more detailed determination of sameness. In this case, depending on the array of time intervals between subtitles, it may be impossible to identify a single motion picture content. Therefore, a transmission request for another subtitle feature quantity may be transmitted to the information processing apparatus 100 so as to identify a commented motion picture content from the motion picture contents having these content IDs. Examples of other subtitle feature quantities include subtitle data representing the contents of subtitles and the like. The subtitle data have a larger amount of information than a subtitle feature quantity represented as a difference between time stamps, but the amount of subtitle data is much smaller than the amount of information of an image feature quantity extracted from an image. Therefore, the subtitle data do not greatly reduce the processing speed.

The sameness determination processing performed on a content by the sameness determination system according to the embodiment has been hereinabove explained. According to the above processing, the sameness of the motion picture content is determined using the subtitle feature quantity extracted on the basis of the subtitle information, which has a much smaller amount of information than the image feature quantity extracted from the image information. Therefore, the sameness of the motion picture content can be determined at a high speed.

<4. Example of Hardware Configuration>

Figure 5:
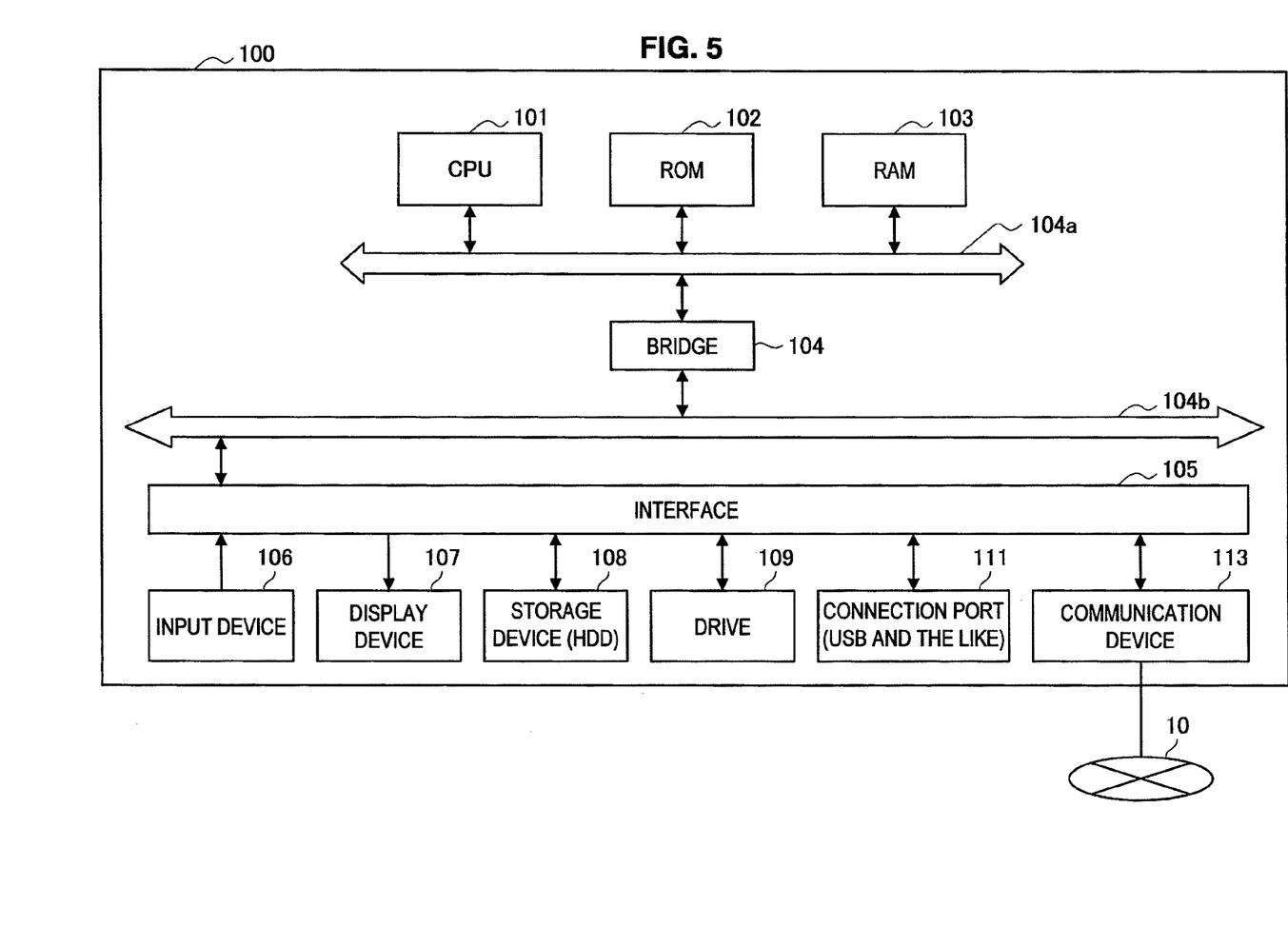
FIG. 5 is a block diagram illustrating an example of hardware configuration of an information processing apparatus according to the embodiment.

The processing of the information processing apparatus 100 according to the embodiment can be executed by hardware or by software. In this case, the information processing apparatus 100 can be made as a computer as shown in FIG. 5. An example of hardware configuration of the information processing apparatus 100 according to the embodiment will be hereinafter explained with reference to FIG. 5.

As described above, the information processing apparatus 100 according to the embodiment can be achieved with a processing apparatus such as a computer. As shown in FIG. 5, the information processing apparatus 100 includes a CPU (Central Processing Unit) 101, a ROM (Read Only Memory) 102, a RAM (Random Access Memory) 103, and a host bus 104a. In addition, the information processing apparatus 100 includes a bridge 104, an external bus 104b, an interface 105, an input device 106, an output device 107, a storage device (HDD) 108, a drive 109, a connection port 111, and a communication device 113.

The CPU 101 functions as a calculation processing unit and a control device, so as to control overall operation in the information processing apparatus 100 in accordance with various kinds of programs. The CPU 101 may be a microprocessor. The ROM 102 stores programs, operational parameters, and the like used by the CPU 101. The RAM 103 temporarily stores programs used during execution of the CPU 101 and parameters and the like that change as necessary during the execution. These are connected with each other by the host bus 104a constituted by a CPU bus and the like.

The host bus 104a is connected to the external bus 104b such as a PCI (Peripheral Component Interconnect/Interface) bus via the bridge 104. It should be noted that it is not necessary to separately arrange the host bus 104a, the bridge 104, and the external bus 104b. These functions may be implemented with only one bus.

The input device 106 includes, for example, input means for inputting information such as a mouse, a keyboard, a touch panel, buttons, a microphone, switches, and levers, and an input control circuit for generating an input signal based on user input and outputting the input signal to the CPU 101. The output device 107 includes, for example, a display device such as a liquid crystal display (LCD) device, an OLED (Organic Light Emitting Diode) device, and lamps, or includes an audio output device such as a speaker.

The storage device 108 is an example of a storage unit for the information processing apparatus 100. The storage device 108 is a device for storing data. The storage device 108 may include a storage medium, a recording device for recording data to the storage medium, a reading device for reading data from the recording medium, an erasing device for erasing data recorded in the storage medium, and the like. The storage device 108 is constituted by, for example, an HDD (Hard Disk Drive). The storage device 108 drives the hard disk and stores programs and various kinds of data executed by the CPU 101.

The drive 109 is a reader/writer for a storage medium. The drive 109 is provided in the information processing apparatus 100, or is attached externally to the information processing apparatus 100. The drive 109 reads information recorded in a loaded removable recording medium such as a magnetic disk, an optical disk, a magneto-optical disk, and a semiconductor memory, and outputs the information to the RAM 103.

The connection port 111 is an interface for connecting to an external device, that is, a connection port for connecting to the external device capable of transmitting data using, for example, USB (Universal Serial Bus). For example, the communication device 113 is a communication interface constituted by a communication device for connecting to a communication network 10. The communication device 112 may be a communication device supporting wireless LAN (Local Area Network), a communication device supporting wireless USB, or may be a wired communication device for communicating via a wire.

It should be understood by those skilled in the art that various modifications, combinations, sub-combinations and alterations may occur depending on design requirements and other factors insofar as they are within the scope of the appended claims or the equivalents thereof.

For example, in the above embodiments, the sameness determination processing performed on motion picture content having subtitle information has been hereinabove explained. However, the present disclosure is not limited thereto. For example, even when the subtitle information is not attached to the distributed motion picture content itself, the sameness of the motion picture content can be determined using subtitle information simultaneously broadcasted in one-segment broadcasting as long as the motion picture content is broadcasted in digital terrestrial broadcasting. In this case, the subtitle track separation units 120, 212 separates the subtitle information of the one-segment broadcasting, and outputs the separated subtitle information to the subtitle feature quantity extraction unit 130. The subtitle feature quantity extraction unit 130 can extract a subtitle feature quantity from the subtitle information in the same manner as the above processing.

The present disclosure contains subject matter related to that disclosed in Japanese Priority Patent Application JP 2010-136304 filed in the Japan Patent Office on Jun. 15, 2010, the entire content of which is hereby incorporated by reference.

What is claimed is:

1. An information providing server comprising:
one or more processors and/or circuits in the information providing server, wherein the one or more processors and/or circuits are operable to:
extract a first subtitle feature quantity representing a feature of first content from subtitle information included in the first content;
associate and store identification information capable of identifying the first content and the first subtitle feature quantity extracted from the first content;
receive comment information, from an information processing apparatus different from the information providing server, providing a user's comment on second content, wherein the information processing apparatus generates the comment information by attaching a second subtitle feature quantity corresponding to the second content to the user's comment;
collate the stored first subtitle feature quantity and the second subtitle feature quantity included in the comment information received from the information processing apparatus;
determine sameness between the first content corresponding to the stored first subtitle feature quantity and the second content corresponding to the second subtitle feature quantity based on the collation; and
output a result based on the determined sameness.

2. The information providing server according to claim 1, wherein the one or more processors and/or circuits are further operable to:
separate the subtitle information included in the first content; and
extract at least an array including a time interval between subtitles as the first subtitle feature quantity on the basis of the separated subtitle information.

3. The information providing server according to claim 2, wherein the one or more processors and/or circuits are further operable to arrange subtitle data representing a plurality of subtitle contents included in the first content in a time sequence on the basis of display times of the subtitle data, and calculate, as an array of time intervals between the subtitle data, a numerical string including a difference of the display times of the subtitle data adjacent to each other in the time sequence.

4. The information providing server according to claim 2, wherein the one or more processors and/or circuits are further operable to extract, as the first subtitle feature quantity, subtitle data representing a plurality of subtitle contents from the subtitle information.

5. The information providing server according to claim 1, wherein when the extracted first subtitle feature quantity matches, at least partially, the second subtitle feature quantity, the one or more processors and/or circuits are operable to determine that the first content and the second content are same.

6. The information providing server according to claim 5, wherein when the first subtitle feature quantity partially matches the second subtitle feature quantity, the one or more processors and/or circuits are operable to calculate a degree of match between the first subtitle feature quantity and the second subtitle feature quantity.

7. The information providing server according to claim 6, wherein when the one or more processors and/or circuits are operable to determine that the degree of match is equal to or more than a predetermined rate for a plurality of contents, and output identification information of the plurality of contents as the collation result.

8. The information providing server according to claim 1, wherein the one or more processors and/or circuits are operable to store the first subtitle feature quantity using an N-gram method.

9. The information providing server according to claim 1, wherein when the first content is terrestrial digital broadcasting content that is broadcasted in terrestrial digital broadcasting, the one or more processors and/or circuits are operable to extract the first subtitle feature quantity on the basis of the subtitle information of a one-segment broadcasting content that is broadcasted in one-segment broadcasting simultaneously with the terrestrial digital broadcasting content when the terrestrial digital broadcasting content does not include any subtitle information.

10. An information processing apparatus comprising:
one or more processors and/or circuits in the information processing apparatus, wherein the one or more processors and/or circuits are operable to:
separate first subtitle information included in first content from the first content;
extract a first subtitle feature quantity representing a feature of the first content on the basis of the separated first subtitle information; and
transmit comment information to an information providing server different from the information processing apparatus providing a user's comment associated with the first content on a network, wherein the comment information is generated by attaching the extracted first subtitle feature quantity to the user's comment, wherein the information providing server collates the first subtitle feature quantity received from the information processing apparatus and a second subtitle feature quantity associated with a second content.

11. A sameness determination system for determining a sameness of a content, the sameness determination system comprising:
an information processing apparatus for inputting a user's comment on first content; and
an information providing server different from the information processing apparatus for providing, on a network, the user's comment received from the information processing apparatus,
wherein the information processing apparatus comprises a first set of one or more processors and/or circuits operable to:
separate first subtitle information included in the first content from the first content;
extract a first subtitle feature quantity representing a feature of the first content on the basis of the separated first subtitle information;
input the user's comment made on the first content; and
transmit comment information to the information providing server providing the user's comment on the network, wherein the comment information is generated by attaching the extracted first subtitle feature quantity to the user's comment made on the first content, and the information providing server comprises a second set of one or more processors and/or circuits operable to:
extract a second subtitle feature quantity representing a feature of second content from second subtitle information included in the second content;
associate and store identification information to identify the second content and the second subtitle feature quantity extracted from the second content;
collate the second subtitle feature quantity and the first subtitle feature quantity included in the comment information received from the information processing apparatus;
determine sameness between the second subtitle feature quantity and the first subtitle feature quantity in the comment information based on the collation; and
output a result based on the determined sameness.

12. A sameness determination method comprising:
inputting a user's comment made on first content to separate first subtitle information included in the first content from the first content received by an information processing apparatus;
extracting a first subtitle feature quantity representing a feature of the first content on the basis of the first subtitle information; and
transmitting comment information to an information providing server different from the information processing apparatus providing the user's comment on a network, wherein the comment information is made by attaching the first subtitle feature quantity to the user's comment made on the first content, wherein the information providing server:
extracts a second subtitle feature quantity representing a feature of second content from second subtitle information included in the second content;
associates and stores identification information to identify the second content and the second subtitle feature quantity extracted from the second content;
collates the second subtitle feature quantity and the first subtitle feature quantity included in the comment information received from the information processing apparatus;
determines sameness between the second subtitle feature quantity and the first subtitle feature quantity in the comment information based on the collation; and
outputs a collation result based on the determined sameness.

13. A non-transitory computer readable storage medium having stored thereon, a computer program having at least one code section executable by a computer, thereby causing the computer to perform the steps comprising:
in an information providing server:
extracting a first subtitle feature quantity representing a feature of first content from first subtitle information included in the first content;
associating and storing identification information to identify the first content and the first subtitle feature quantity extracted from the first content;
receiving comment information, from an information processing apparatus different from the information providing server, providing a user's comment on second content, wherein the information processing apparatus generates the comment information by attaching a second subtitle feature quantity corresponding to the second content to the user's comment;

collating the stored first subtitle feature quantity and the second subtitle feature quantity included in the comment information received from the information processing apparatus;

determining sameness between the first content corresponding to the stored first subtitle feature quantity and the second content corresponding to the second subtitle feature quantity based on the collation; and outputting a result based on the determined sameness.

* * * * *